US008025231B2

(12) United States Patent
Allen et al.

(10) Patent No.: US 8,025,231 B2
(45) Date of Patent: Sep. 27, 2011

(54) TAG READER

(75) Inventors: Philip John Allen, Nottingham (GB); Andrew John Gilbert, Kent (GB)

(73) Assignee: Filtrona PLC, Nottingham (GB)

( * ) Notice: Subject to any disclaimer, the term of this patent is extended or adjusted under 35 U.S.C. 154(b) by 341 days.

(21) Appl. No.: 12/097,458

(22) PCT Filed: Dec. 18, 2006

(86) PCT No.: PCT/GB2006/004718

§ 371 (c)(1), (2), (4) Date: Nov. 14, 2008

(87) PCT Pub. No.: WO2007/068952

PCT Pub. Date: Jun. 21, 2007

(65) Prior Publication Data

US 2009/0255990 A1 Oct. 15, 2009

(30) Foreign Application Priority Data

Dec. 16, 2005 (GB) .................................. 0525664.9

(51) Int. Cl.
*G06K 7/10* (2006.01)

(52) U.S. Cl. ......................... 235/439; 235/383; 235/384

(58) Field of Classification Search .................. 235/383, 235/384, 439

See application file for complete search history.

(56) References Cited

U.S. PATENT DOCUMENTS 5,655,643 A * 8/1997 Bonnet .................... 198/370.08

FOREIGN PATENT DOCUMENTS

DE 20118645 U1 1/2002

(Continued)

OTHER PUBLICATIONS

International Search Report dated Mar. 20, 2007 (PCT/GB06/04718).

(Continued)

*Primary Examiner* — Karl D Frech

(74) *Attorney, Agent, or Firm* — Banner & Witcoff, Ltd

(57) ABSTRACT

A hand held electronic detector is provided for detecting the presence/absence and/or nature of a mark on an article (not shown) such as a security mark. The article may comprise a product, such as for example a pack of cigarettes. The detector comprises a case or body of strong rigid plastics material. The case comprises front and rear parts and which are connected together by concealed hinges, at their lower edges, so that the parts and can move hingedly between a closed configuration and a fully open configuration, in which the front and rear parts are angularly spaced by approximately 180°. There is a further defined intermediate open configuration in which the front and rear parts and are angularly spaced by approximately 90° . . . . When opening the case from the closed position the hinges 'lock' when the front and rear parts reach this intermediate position. The hinges will only 'unlock', so that the case can be opened further or closed, if sufficient force is applied. Relative movement of the case parts and to the fully open configuration shown in FIG. 2 is limited by hinges. In an open configuration the detector presents an article-locating station comprising a mounting surface for receiving an article, and alignment means, located on the mounting surface, which in this case is a marked line on the mounting surface with which the security mark should be aligned.

12 Claims, 4 Drawing Sheets

FOREIGN PATENT DOCUMENTS

| | | | |
|---|---|---|---|
| DE | 10316954 | A1 | 10/2004 |
| EP | 0101115 | A | 2/1984 |
| EP | 0424342 | A2 | 4/1991 |
| EP | 1160737 | A1 | 12/2001 |
| EP | 1347422 | A1 | 9/2003 |
| GB | 2146823 | A | 4/1984 |
| GB | 2309778 | A | 8/1997 |
| WO | 95/19019 | A2 | 7/1995 |
| WO | 2005/036476 | A1 | 4/2005 |
| WO | 2005/086099 | A | 9/2005 |

OTHER PUBLICATIONS

British Search Report dated Apr. 25, 2007 (GB0625195.3).

* cited by examiner

TAG READER

BACKGROUND OF THE INVENTION

The present invention relates to a detector for detecting the presence/absence and/or nature of a security mark on an article.

In the field of product or document security it is known to place a machine readable mark on an article or its packaging, which mark can be read by a detector to identify the article and/or to verify the authenticity or otherwise of the article. Such a mark may typically be printed on the article, and may be invisible to the naked eye.

For example, there exist particularly sophisticated, complex inks which reliably emit radiation with certain characteristics under exposure to radiation in a certain frequency range. Such complex inks, which are by their nature difficult for counterfeiters to manufacture include inks known as taggant inks.

A taggant-ink marking on an article will, when exposed to appropriate radiation, exhibit behaviour of a certain signature or characteristic peculiar to that ink. For example, when the ink sample is irradiated by radiation at an “excitation” frequency, the ink sample will emit radiation, at an emission frequency, and will continue to do so after exposure to the excitation radiation has ceased. The emitted radiation, after excitation has ceased, decays in a known, repeatable manner which is unique to the particular taggant.

One example of taggant material, as used in such complex inks, comprises a base material of lattice structure which includes one or more rare-earth metal dopants. By varying the level of dopant, or the position of the dopant molecules within the lattice, it is possible to produce a range of taggant materials which exhibit different, but predictable and repeatable, emission characteristic when excited by a radiation source.

Typically a detector is used to provide the excitation radiation and then to detect emitted radiation to determine the presence/absence, and in certain cases the signature or characteristic, of ink on the article or its packaging.

The detector must therefore incorporate some form of radiation source, the frequency of which must be known, precise and reliably repeatable, and a detection mechanism which is able to detect the presence of emitted radiation of the appropriate frequency.

Such detectors are often used by operatives “in the field” to check consignments of articles in order to identify counterfeit articles.

Detectors used by operatives should advantageously be portable and easy to use.

Known detectors have several problems. Firstly, where emitted radiation to be measured is in the visible part of the spectrum, if the detector is not positioned accurately in relation to the article the ambient light can easily interfere with the detection process, giving inaccurate readings. Secondly, since the taggant ink may be invisible, the operative in the field may have difficulty positioning the article correctly so that the reading can be made.

SUMMARY OF THE INVENTION

According to one aspect of the present invention there is provided a detector for detecting the presence/absence and/or nature of a security mark on an article, the detector comprising:

emitting means for emitting radiation, detection means for detecting radiation, and an article-locating portion for locating an article in use which article-locating portion comprises alignment means for ensuring that an article is aligned with the emitting means and/or the detection means.

The detector may comprise a body which preferably has first and second parts movable relative to each other between at least a first, closed configuration, and a second, open configuration wherein in the open configuration the article-locating portion is exposed and the detector is arranged to receive an article to be irradiated.

Preferably, the article-locating portion comprises a mounting surface, against which an article may rest in use, together with alignment means for ensuring that an article is aligned with the emitting means and/or the detection means.

The article-locating portion may be arranged to locate an article in use on the mounting surface such that a predetermined portion of the article is presented to the emitting means and/or to the detection means.

The emitting means and detection means may be concealed behind one, or more than one, window.

The alignment means may comprise a mark or profile on the mounting surface such that in use the mark or edge provides a reference for the accurate positioning of the article with respect to the emitting means and/or detection means.

The detector may be provided with proximity detection means for detecting the presence and/or absence of an article.

The detector may be provided with a display means arranged in use to display the result of a detection operation. The display means is preferably arranged to provide an indication of the presence/absence and/or nature of a mark detected on an article in use.

The first and second parts of the body are preferably hingedly connected. The first and second parts of the body may hingedly move between the first and second configurations.

At least one movement-stop means may be provided to limit the extent of relative movement of the first and second parts of the case.

A means for retaining the first and second parts in an intermediate open configuration may be provided.

In the closed configuration the body is preferably arranged to protect the emission means and/or detection means and/or the mounting surface.

Preferably the detector is arranged to be hand held in use.

The invention also includes a method of detection the presence/absence and/or nature of a security mark on an article, the method comprising placing an article adjacent to an article-locating portion, aligning the article using the alignment means, automatic initiation of an emission/detection operation and displaying the result of the operation on the display means to establish the presence/absence and/or nature of a security mark on the article.

The apparatus may be according to any statement herein.

Preferably the method includes moving the first and second parts of a body of the detector to an open configuration.

BRIEF DESCRIPTION OF THE DRAWINGS

A preferred embodiment of the present invention will now be described, by way of example only, with reference to the accompanying diagrammatic drawings in which.

DESCRIPTION OF AN EMBODIMENT OF THE INVENTION

Figure 1:
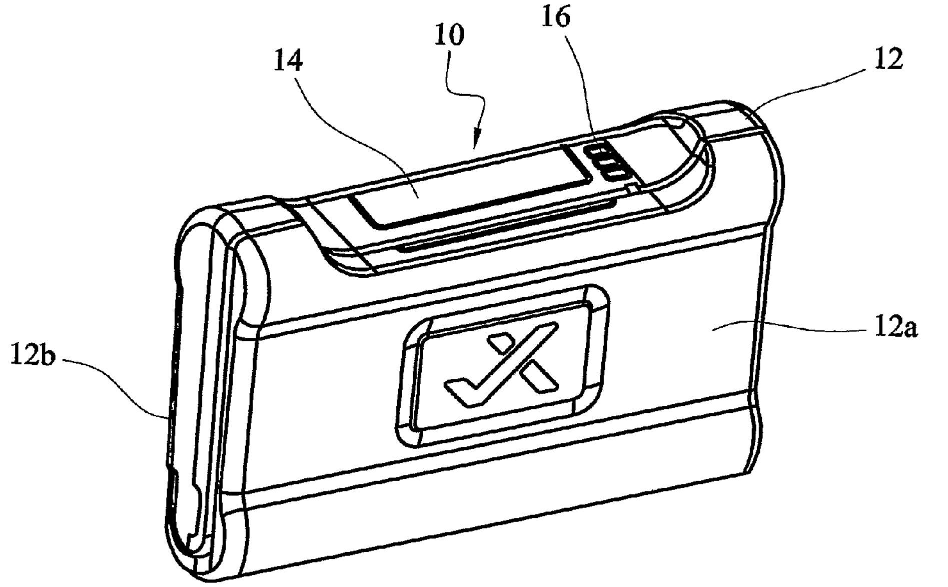
FIG. 1 shows, in perspective view, a detector according to an embodiment of the invention, in a first, closed configuration.
Figure 2:
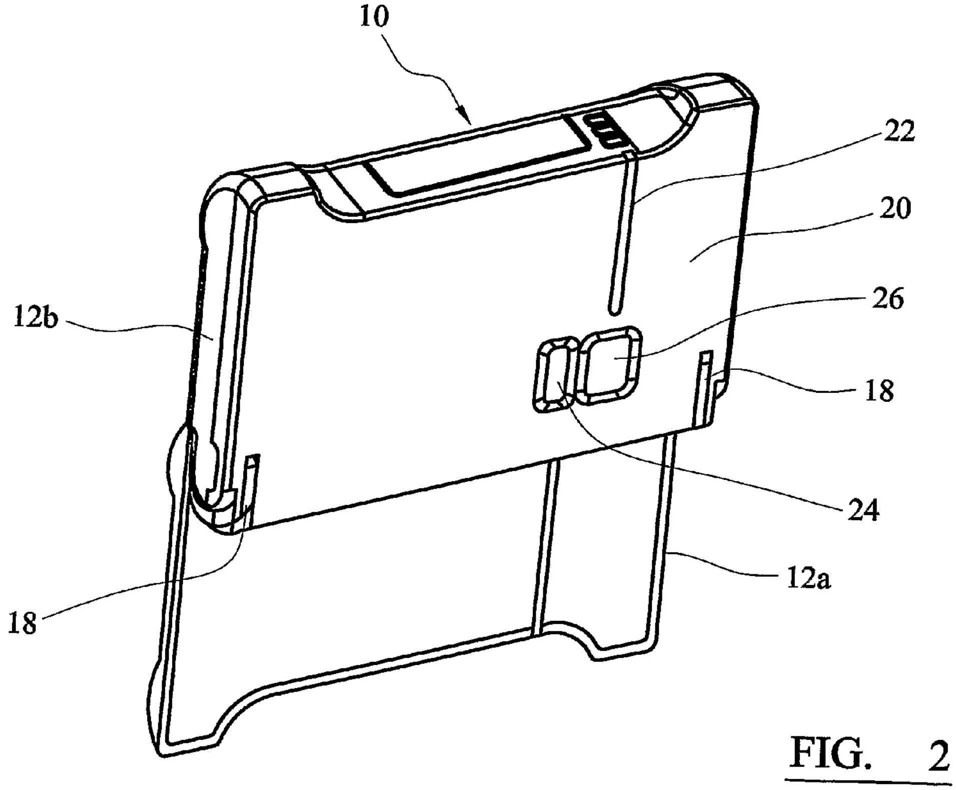
FIG. 2 shows the detector in FIG. 1 in a second, open configuration.
Figure 3:
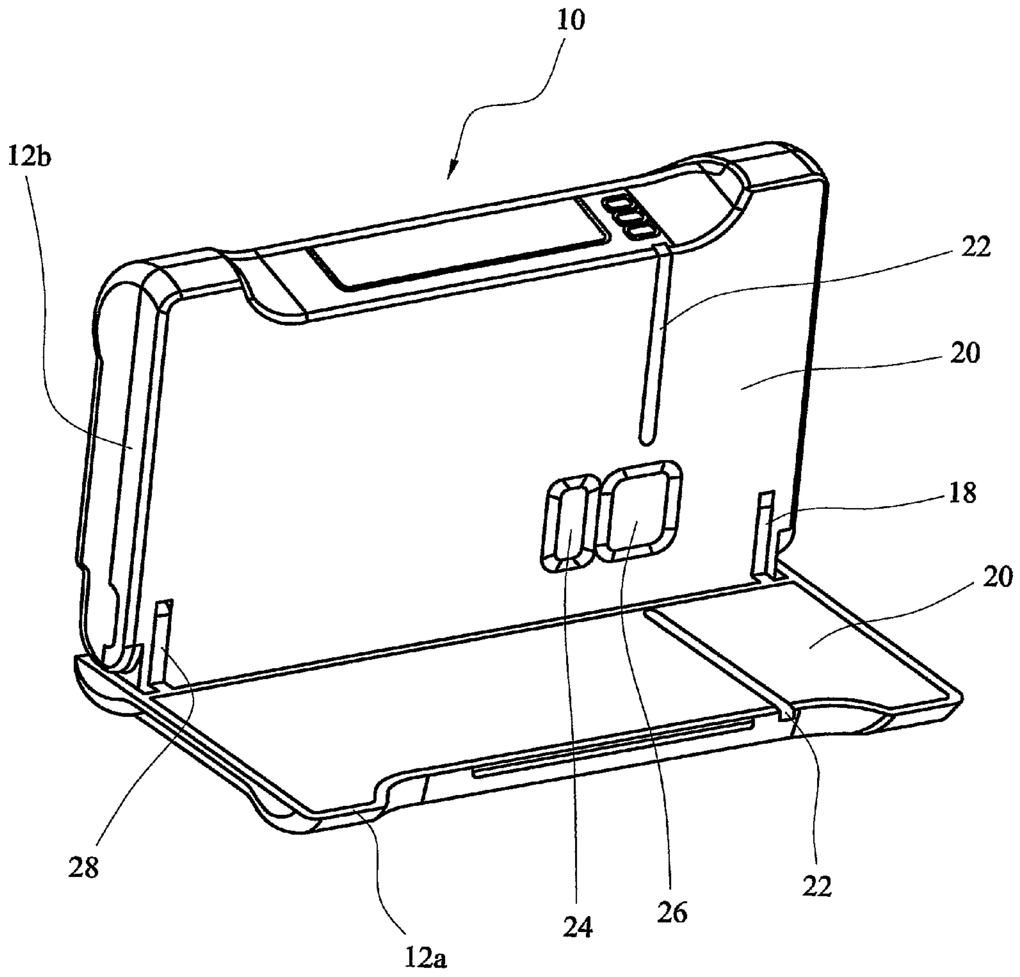
FIG. 3 shows the detector in FIGS. 1 and 2 in a third, open configuration.

Turning to FIGS. 1-3 of the drawings, there is shown generally at 10 a hand held electronic detector for detecting the presence/absence and/or nature of a mark on an article (not shown) such as a security mark. The article may comprise a product, such as for example a pack of cigarettes.

The detector 10 comprises a case or body 12 of strong, rigid plastics material. The case 12 comprises front and rear parts 12*a* and 12*b* which are connected together by concealed hinges at their lower edges, so that the parts 12*a* and 12*b* can move hingedly between a closed configuration (shown in FIG. 1) and a fully open configuration, in which the front and rear parts are angularly spaced by approximately 180°, (shown in FIG. 2). There is a further defined intermediate open configuration in which the front and rear parts 12*a* and 12*b* are angularly spaced by approximately 90° (shown in FIG. 3). When opening the case from the closed position the hinges 18 'lock' when the front and rear parts reach this intermediate position. The hinges will only 'unlock', so that the case can be opened further or closed, if sufficient force is applied. Relative movement of the case parts 12*a* and 12*b* to the fully open configuration shown in FIG. 2 is limited by hinges 18.

In an open configuration the detector 10 presents an article-locating station comprising a mounting surface 20 for receiving an article, and alignment means 22, located on the mounting surface 20, which in this case is a marked line on the mounting surface 20 with which the security mark should be aligned.

An emission/detection window 26 is provided on the case part 12*b* through which radiation can be emitted and received. The window 26 is recessed to protect the surface thereof. Further provided on case part 12*b* is a proximity detector 24 for detecting the presence of an object located on the mounting surface 20. In this case an infrared proximity detector 24 is used.

In the open configuration, the detector 10 is arranged to receive and position an article to be checked, such that a predetermined portion of the article is facing, and accurately aligned with, the emission/detection window 26 and a portion of the article is covering the infrared proximity detector 24.

On an upper edge of the rear case part 12*b* there is located an electronic display panel 14, comprising an LCD display together with indictor LEDs 16.

Concealed within case part 12*b* is electronic circuitry including a programmable controller described below in relation to FIG. 5. Movement from the closed to the open or intermediate configurations is advantageously arranged to turn the electronic circuitry within part 12*b* into an ON state. On turning the circuitry from the OFF state into the ON state an internal check is automatically performed to ensure the circuitry is functioning correctly. If any malfunction or low battery state is detected then this is displayed as a message on the display panel 14.

The electronic controller (not shown) may be programmed for the detection of a specific mark, such as a taggant or other ink exhibiting certain characteristic behaviour under exposure to a certain radiation.

In the detector's ON state a taggant detection operation constantly occurs. The result of this detection operation is displayed on the LCD display 14. As an additional indicator, the plurality of LEDs, which are preferably coloured according to their function, illuminate appropriately in accordance with a state (1) no taggant is detected, a state (2) in which a taggant is detected, but it is not the specific one which had been sought, and a state (3) in which the test is deemed positive in that the specific taggant sought is detected. If the controller is appropriately programmed, the display panel 14 may display information related to the detected taggant.

Figure 4:
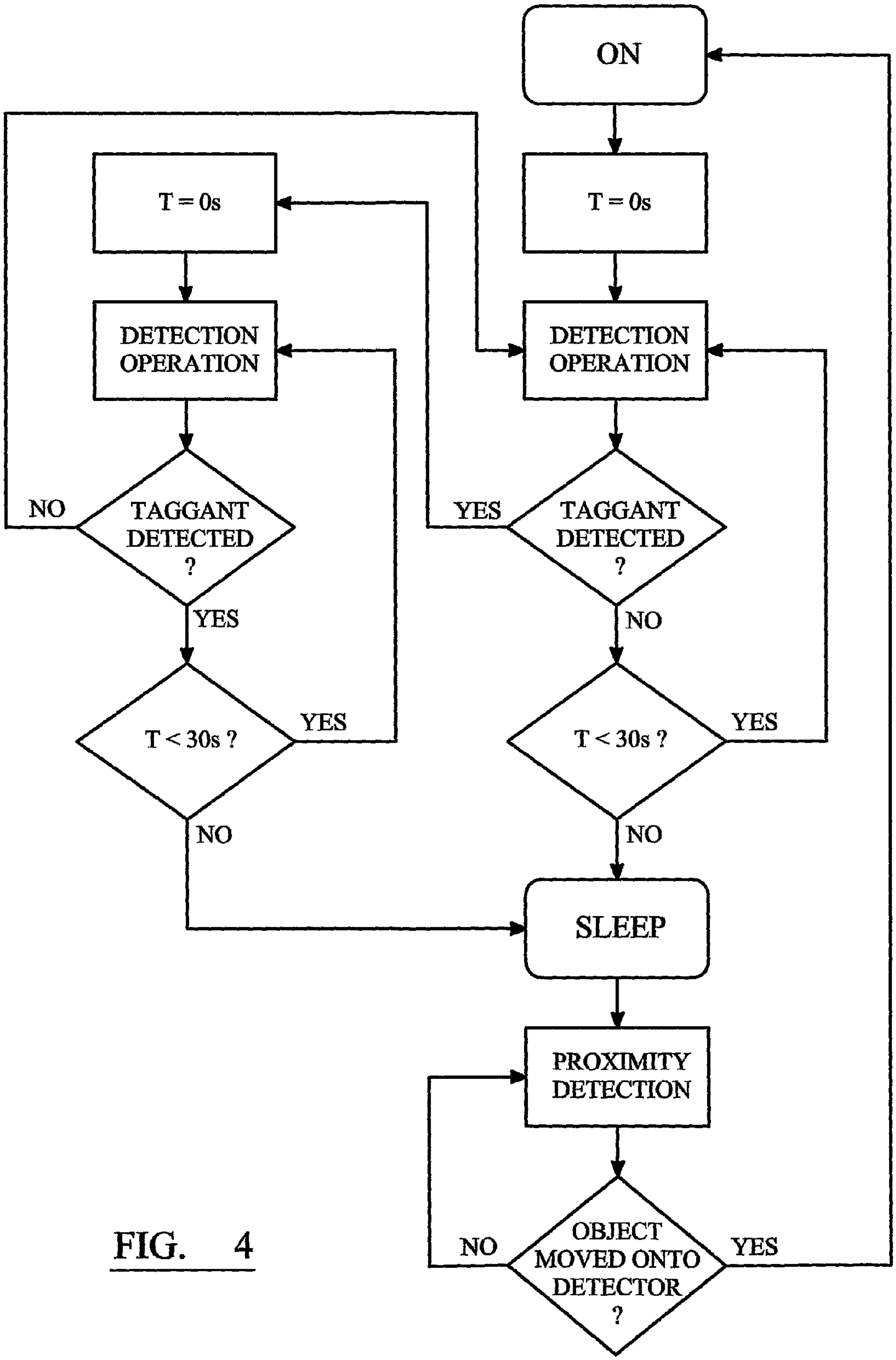
FIG. 4 shows a flowchart of the power saving feature.

In order to save power a further SLEEP state exists, FIG. 4 illustrates this power saving feature. In the SLEEP state the taggant detection operation does not take place and a proximity detector 24 is turned on. The SLEEP state is entered into if within the previous 30 seconds the detector has not gone through the sequence of (a) detecting a taggant, (b) not detecting a taggant and (c) detecting a taggant. This ensures that if a series of taggant marked objects are tested in quick succession then the detector stays on. The ON state is re-entered, from the SLEEP state, when the proximity detector senses an object being placed onto the mounting surface 20.

When not in use, the case parts 12*a* and 12*b* can be moved to the closed configuration to protect the windows 24 and 26 and the surface 20. Advantageously, the closure of the device also switches OFF the circuitry in case part 12*b*. Whereas moulded plastic has been used for the case in this embodiment other suitable materials may be used, such as pressed aluminium.

Figure 5:
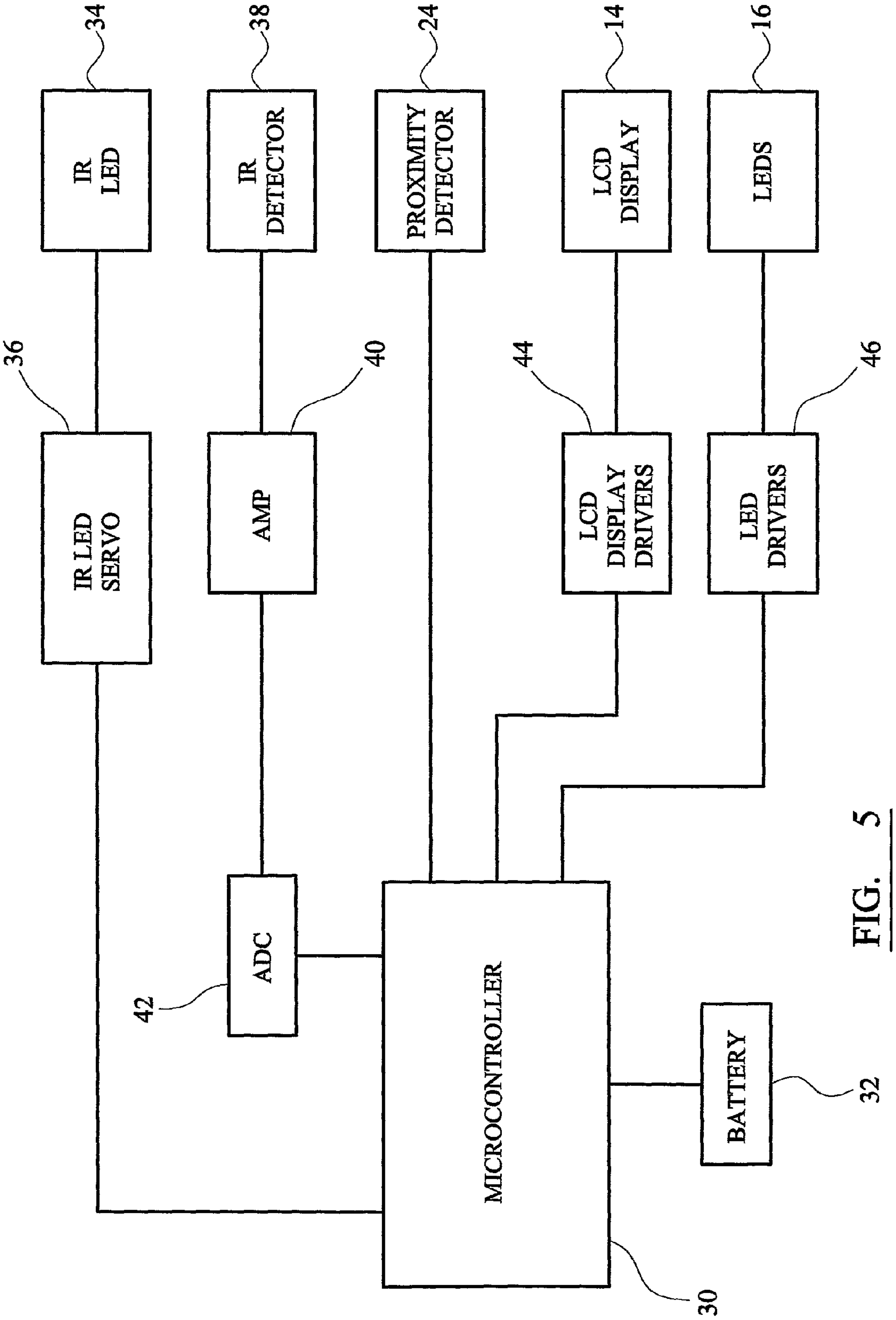
FIG. 5 is a schematic circuit diagram of the internal components of the detector of FIGS. 1-3.

FIG. 5 shows schematically the components within the case 12. A microcontroller 30, deriving power from a battery 32, controls the operation of an infrared LED 34 via LED servo 36. The infrared LED 34 in use irradiates an article (not shown) with infrared radiation. Infrared radiation which is then emitted from the article by virtue of the presence of a taggant substance on the article is detected by infrared detector 38 and its signal is then amplified by amplifier 40 and converted by analogue to digital converter 42 before being fed to the microcontroller 30.

As described above, proximity detector 24 sends an "article present" or "article not present" signal to the microcontroller 30.

The LCD display 14 is driven by an LCD display driver 44 and LEDs 16 are driven by an LED driver 46 under the control of the microcontroller 30, as described above.

In an alternative embodiment (not shown) the device includes a port which can be used for connecting apparatus or instruments to the device in order to perform tests, in order to reprogram the microcontroller 30, or in order to couple the device to a secondary, remote detection apparatus.

In a still further embodiment (not shown) the device can be used to automatically actuate another device, for example to activate apparatus or an instrument, or else to operate a lock, in the event that the device detects the presence of an appropriate taggant material.

While specific embodiments have been disclosed, the invention is not limited thereto and comprises embodiments within the scope of the following claims and equivalents.

The invention claimed is:

1. A detector for detecting the presence/absence and/or nature of a security mark on an article, the detector comprising:

emitting means for emitting radiation, detection means for detecting radiation, an article-locating portion for locating an article in use which article-locating portion comprises alignment means for ensuring that an article is aligned with the emitting means and/or the detection means, and a body which has first and second parts movable relative to each other between at least a first, closed configuration, and a second, open configuration wherein in the open configuration the article-locating portion is exposed and the detector is arranged to receive an article to be irradiated, wherein the emitting means and detection means are located on the same part of the body.

2. A detector according to claim 1, wherein the article-locating portion comprises a mounting surface, against which an article may rest in use, together with alignment means for ensuring that an article is aligned with the emitting means and/or the detection means.

3. A detector according to claim 2, wherein the article-locating portion is arranged to locate an article in use on the mounting surface such that a predetermined portion of the article is presented to the emitting means and/or to the detection means.

4. A detector according to claim 2, wherein the alignment means comprises a mark or profile on the mounting surface such that in use the mark provides a reference for the accurate positioning of the article with respect to the emitting means and/or detection means.

5. A detector according to claim 1, wherein the emitting means and detection means are concealed behind at least one window.

6. A detector according to claim 1, wherein the detector is provided with proximity detection means for detecting the presence and/or absence of an article.

7. A detector according to claim 1, wherein the detector is provided with a display means arranged in use to display the result of a detection operation.

8. A detector according to claim 7, wherein the display means is arranged to provide an indication of the presence/absence and/or nature of a mark detected on an article in use.

9. A detector according to claim 1, wherein the first and second parts of the body are hingedly connected and hingedly move between the first and second configurations.

10. A detector according to claim 1, wherein at least one movement-stop means is provided to limit the extent of relative movement of the first and second parts of the case.

11. A detector according to claim 1, wherein means for retaining the first and second parts in an intermediate open configuration are provided.

12. A method of detecting the presence/absence and/or nature of a security mark on an article using a detector, the method comprising moving first and second parts of a body of the detector to an open configuration to expose an article-locating portion, placing an article adjacent to the article-locating portion, aligning the article using alignment means, automatically initiating an emission/detection operation and displaying the result of the operation on display means to establish the presence/absence and/or nature of a security mark on the article.

* * * * *